United States Patent [19]

Gentles

[11] 4,209,402
[45] Jun. 24, 1980

[54] KIDNEY DIALYSIS FILTER WASHING PROCESS

[76] Inventor: William M. Gentles, 22 Inglewood Dr., Toronto, Canada

[21] Appl. No.: 814,856

[22] Filed: Jul. 12, 1977

[51] Int. Cl.² ................................................ B01D 31/00
[52] U.S. Cl. ..................... 210/137; 134/95; 210/140; 210/321 B; 210/356
[58] Field of Search ............. 134/58 R, 103, 98, 95, 134/122; 210/356, 321 B, 140, 137; 422/44; 128/214 R

[56] References Cited

U.S. PATENT DOCUMENTS

| | | | |
|---|---|---|---|
| 3,441,035 | 4/1969 | Edwards | 134/103 |
| 3,450,263 | 6/1969 | Dambrine et al. | 210/356 X |
| 3,834,535 | 9/1974 | Portyrata | 210/356 X |

FOREIGN PATENT DOCUMENTS 2310136  12/1976  France ........................... 210/321

Primary Examiner—Frank A. Spear, Jr.

[57] ABSTRACT

Kidney dialysis filters, or artificial kidneys, which contain a dialysis membrane mounted inside a housing and separating the housing into a blood side compartment and dialysate side compartment are washed for reuse by a process in which washing water is supplied to the blood side through an inlet hose, and exits through a remote, resiliently expandable and contractable outlet hose to a drain. After flushing of the blood side by water flow in this manner, the outlet is closed while continuing washing fluid feed, to build up fluid pressure inside the blood compartment, and then the fluid feed is interrupted. A drain in the inlet conduit is then opened to cause brief reversal of flow of fluid within the blood side, due to relaxation of the membrane and the outlet hose to relieve the fluid pressure. Then steady flow of fluid is resumed. This brief reversal of flow causes a fluid action to dislodge contaminating blood particles from the membrane and elsewhere.

4 Claims, 4 Drawing Figures

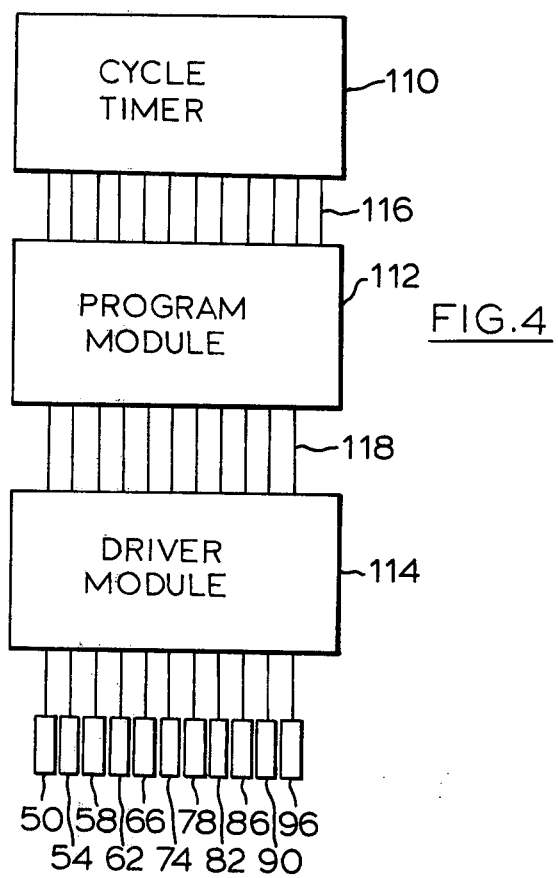

KIDNEY DIALYSIS FILTER WASHING PROCESS

FIELD OF THE INVENTION

This invention relates to filter washing processes and apparatus, more particularly to processes and apparatus for washing artificial kidneys.

BACKGROUND TO THE INVENTION

The function of the normal, healthy kidney in the animal body is to act as a filter for the blood circulating through the body, to remove impurities therefrom and restore correct blood composition balance. When the kidneys cease to function, artificial kidneys can be employed in their place, such an artificial kidney comprising a flexible dialysis membrane used outside the body as a separate treatment apparatus for blood dialysis or filtration purposes. Blood from the body is circulated past one side of the membrane and special dialysis fluid is circulated past the other side of the membrane, so as to adjust and correct the blood composition by osmosis, diffusion and ultrafiltration across the membrane. A patient with deficient natural kidney function normally makes periodic use of an artificial kidney machine, in which his blood is circulated continuously past such a dialysis membrane, a small volume at a time, over a period of 4–8 hours for purification.

The kidney dialysis filters or artificial kidneys as used in such artificial kidney machines are commercially available in self-contained, cartridge form, ready for use with the machine. The filters comprise a housing containing a flexible dialysis membrane separating a blood side and a dialysate side, with inlet and outlet connections for fluid to both blood side and the dialysate side. Essentially, however, such filters are single use, disposable items which are discarded after one use on a single patient. Cleaning of the filters for reuse has been conducted by hand, but it is difficult to ensure a thorough enough cleaning, and is very time consuming and unpleasant.

In any kidney dialysis filter washing process, it is important to eliminate the risk of cross contamination, which will arise if blood particles washed out of one filter become lodged in the washing apparatus, so that they can be washed into a different filter which is subsequently washed using the apparatus, and hence contaminate the blood of the patient who subsequently uses the second filter. If a filter cartridge is washed manually, this problem does not arise. However, any attempts to wash filters automatically and successively whilst hooked up to a washing machine, are likely to run this risk, if reversal of flow of liquids through the filter housing is adopted.

It would be highly desirable to render kidney dialysis filters reusable, by the same patient because of the expense of them, and the frequency with which they need to be used. One patient may need to use the artificial kidney about 12 times per month, with a new filter unit each time.

BRIEF DESCRIPTION OF THE PRIOR ART

As noted above, manual washing of kidney dialysis filters has been attempted, in the past, in which water source connections are made to the filter housing, and water is passed through the housing in contact with the filter membrane in one direction for a period of time, and then the directional flow of water is reversed, to assist in dislodging blood particles which would otherwise remain attached to the membrane. This is not however wholly satisfactory, because of the manual techniques necessary, rendering the process time consuming and difficult to conduct.

A proposal for a machine for cleaning artificial kidneys ready for reuse was made by De Palma et al., and published in "Transactions of the American Society of Artificial Internal Organs," Volume XX, 1974, pages 584–588. It is understood that a machine as described therein was in fact available on the market at one time. However, it is an extremely expensive machine, and hence is prohibitive for acquisition and use by patients and even by many medical facilities. Moreover, it involves the use of a disposable cartridge into which the kidney is fitted for washing purposes, the cartridge being usable only for cleaning the filters of a single patient, and then discarded. This detracts from the economies otherwise obtainable by the reuse of such artificial kidneys after cleaning.

BRIEF SUMMARY OF THE INVENTION

It is an object of the present invention to provide a novel process and apparatus for washing kidney dialysis filters or artificial kidneys, to render them reusable.

It is a further object of the invention to provide a kidney dialysis filter washing process and apparatus which can be operated automatically, and which substantially eliminates the risk of cross contamination of a filter with contaminant particles left from a filter previously washed in the same apparatus.

According to a first aspect of the invention, a flexible filter membrane within a housing, such as an artificial kidney, the housing comprising a first compartment communicating with the first side of the flexible membrane, a fluid inlet communicating with the first compartment and a fluid outlet remote from the fluid inlet and communicating with the first compartment, is washed by a process which comprises the successive steps of:

in a first step, connecting said fluid inlet of the housing to a washing fluid feed hose, and connecting the fluid outlet to a fluid outlet hose;

circulating washing liquid through the first compartment of the housing in contact with the first side of the flexible membrane by feeding washing liquid in through the fluid feed hose and out through said fluid outlet hose;

closing the fluid outlet whilst continuing said feed of washing liquid so as to increase fluid pressure within the housing;

closing the fluid feed conduit to contain the increased fluid pressure within the housing, whilst discontinuing the fluid feed thereto;

opening the fluid inlet for a brief interval to cause brief reversal of flow of washing fluid within the housing to relieve the increased fluid pressure therein;

opening the fluid outlet and resuming the feed of washing liquid through the fluid feed hose.

In the process of the invention, use is made of the elasticity of the dialysis membrane itself, within the housing, and of the fluid outlet hose, to arrange for brief intermittent reversal of flow of the washing fluid. This causes back and forth motion and resultant scrubbing action of the washing liquid, to ensure dislodgement of blood particles left from the previous use of the filter. The reversal of flow occurs after building up excess pressure in the housing with the washing fluid, by subsequently opening a drain branch of the fluid inlet hose. However, this opening of the drain branch, and consequent reversal of flow, is so brief that the washing fluid does not reverse into the fluid inlet hose of the washing apparatus. As a consequence, therefore, no dislodged blood particles can be washed into the fluid inlet hose of the washing apparatus, to be deposited in the next filter washed on the same apparatus, so that risk of cross contamination of the filters is avoided.

According to another aspect of the invention, there is provided an apparatus for washing a flexible filter membrane within a housing, said housing having a first compartment in contact with one side of the membrane, and having a fluid inlet and a fluid outlet, said inlet and said outlet communicating with the first compartment at locations remote from each other, said apparatus comprising:

a fluid inlet hose adapted to communicate with said fluid inlet;

a washing fluid inlet branch communicating with the fluid inlet hose;

first valve means in said washing fluid inlet branch adapted to open and close fluid communication therethrough;

a drain branch communicating with the fluid inlet hose;

second valve means in said drain branch adapted to open and close fluid communication therethrough;

a fluid outlet conduit hose having a resiliently expandable and contractable section adapted to communicate with said outlet;

third valve means in said fluid outlet hose adapted to open and close fluid communication therethrough;

operating means for opening and closing the first, second and third valve means;

timing means controlling said operating means and arranged to actuate said operating means for opening and closing the first, second and third valve means in a predetermined sequence and for predetermined time intervals.

DESCRIPTION OF THE PREFERRED EMBODIMENTS

In the apparatus according to the invention, the operating means for opening and closing the first, second and third valve means is suitably a series of electrical controls, such as solenoids, operable to open or close the valves when energized. These are suitably electrically connected to an electronic timing device, which is preset to open and close the valves automatically in the desired sequence and according to the prearranged time intervals.

Both the blood side and the dialysate side may be washed by a process or by use of an apparatus according to the invention, if desired. Thus the apparatus may also include a similar set of fluid inlet tubes or hoses with valved inlet and drain branches, and a valve fluid outlet tube, with a valve operating means, for washing the dialysate side, as well as those previously described for washing the blood side. The washing of the dialysate side is, however, less critical, since the dialysate solution does not tend to clog the membrane, which is the problem with blood particles on the other side of the membrane.

It is most convenient to include a washing fluid inlet branch, with valve, and a valved drain branch in the fluid outlet hose for flexibility in operation. Also, further valved inlet branches can be provided if desired, in the inlet hoses connectable to the blood side and the dialysate side of the filter, for introducing sterilizing or preservative solution into the filter. Whilst the predominant amount of cleaning of the filter takes place with water, it is of advantage to be able to wash the membrane and other parts of the structure with a water compatible blood solvent also, such as hydrogen peroxide. Storage of artificial kidneys in a sterile condition, e.g., filled with sterilizing liquid, is also desirable. The preferred form of the present invention thus includes means for washing the artificial kidney with liquid blood solvent, and means for filling the artificial kidney with sterilizing liquid. In a particularly preferred embodiment, the washing process according to the invention includes a sequence of steps, carried out automatically, in which the used filter is washed on both sides by water in a steady, or static flow condition, and then the blood side is washed with pressurizing and brief reversal of flow, as previously described, i.e., dynamic washing, whilst the dialysate side is drained. In a subsequent step, the dialysate side is filled and pressurized with hydrogen peroxide solution whilst the blood side is drained. Subsequently both sides are flushed with water, rinsed and filled with formalin as sterilizing solution, to complete the washing operation.

BRIEF REFERENCE TO THE DRAWINGS

FIG. 4 is a block diagram of the electrical control arrangements of an apparatus according to the invention.

DETAILED DESCRIPTION OF THE PREFERRED SPECIFIC EMBODIMENT

Figure 1:
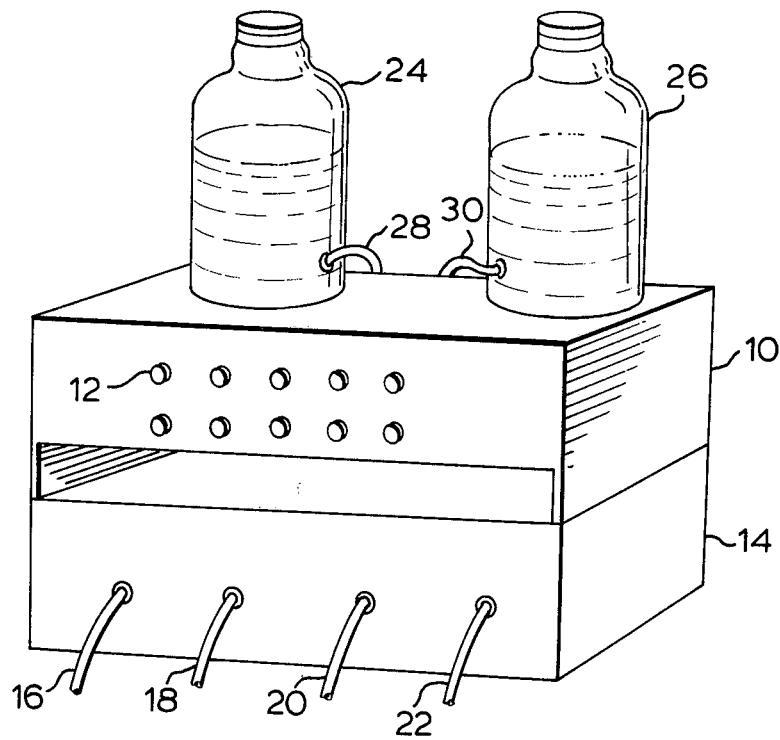
FIG. 1 is a perspective, exterior view of a portion of an apparatus for washing an artificial kidney, in accordance with the present invention.

With reference to FIG. 1, an artificial kidney or dialysis filter washing apparatus according to the present invention comprises an electrical control box 10, provided with manually operable controls 12 on the front panel thereof, and a valve box 14 mounted below the control box 10. Protruding from the valve box 14 are four flexible outlet hoses 16, 18, 20, 22, for connection to a filter unit housing for washing purposes in accordance with the invention. Reagent storage vessels 24, 26 are provided at a convenient location, for supply of sterilizing and cleaning liquids namely formalin and hydrogen peroxide respectively, to the valve box. At its rear face, not shown, the valve box 14 is provided with four inlet hoses, two of which 28, 30 connect respectively to the formalin vessel 24 and the hydrogen peroxide vessel 26, one of the others of which connects to a source of clean water, and the other of which is connected to a drain.

Figure 2:
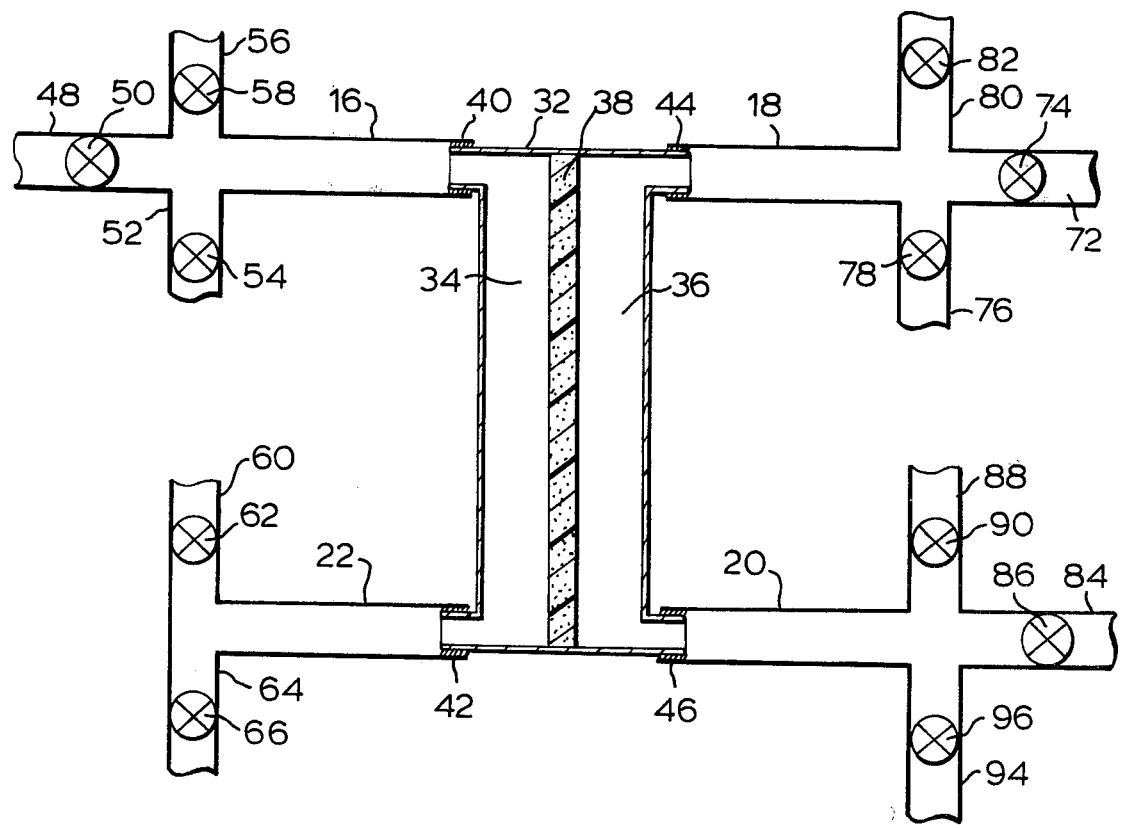
FIG. 2 is a diagrammatic view of parts of the artificial kidney or dialysis filter washing apparatus according to the invention, with a dialysis filter cartridge diagrammatically illustrated in place.

FIG. 2 shows diagrammatically a kidney dialysis filter cartridge or artificial kidney 32 which has a blood side 34 and dialysate side 36, separated by a flexible membrane 38. The blood side 34 has an inlet 40 and an outlet 42, at opposite ends thereof. The dialysate side 36 has an inlet 46 and an outlet 44. When in use by a patient, the artificial kidney has the patient's blood continuously flowing through inlet 40 and outlet 42 to pass through the blood side 34, and a suitable dialysate solution flowing through inlet 46 and outlet 44 to pass through the dialysate side 36. The composition of the patient's blood is corrected by dialysis, across the membrane 38 separating the two compartments. After use, it is extremely important that the blood side 34 be carefully cleaned, to remove all traces of the patient's blood, before the artificial kidney 32 is reused on the same patient. It is less important, but nevertheless desirable, to clean the dialysate side 36 between uses. In addition, the whole artificial kidney should be sterilized and stored in clean, sterile condition between uses.

To ensure the necessary cleaning, according to the present invention, the artificial kidney 32 is connected up to the apparatus of FIG. 1, as shown diagrammatically in FIG. 2. The flexible outlet hose 16, which is of resilient, flexible tubing, is connected to the inlet 40 of the blood side 34 and similarly outlet hose 22 is connected to the outlet 42 of the blood side 34. Outlet hose 18 from the valve box 14 is connected to the outlet 44 of the dialysate side 36, and outlet hose 20 from the valve box 14 is connected to the inlet 46 of the dialysate side. The various resilient flexible hoses 16, 18, 20, 22 in effect constitute branched hoses as shown diagrammatically in FIG. 2 and more precisely in FIG. 3, the various branches being valved and connected to various liquid sources and drain arrangements, to provide for a washing process according to the invention.

Thus inlet hose or conduit 16 to the blood side 34 has an inlet branch 48 closable by means of a solenoid operated valve 50, and a drain branch 52 closable by means of a solenoid operated valve 54. A third branch 56 with a solenoid operated valve 58, for provision of formalin, also communicates with hose 16. The outlet hose 22 from the blood side 34 has a drain branch 60 closable by a solenoid operated valve 62, and a fluid inlet branch 64 closable by a solenoid operated valve 66 therein.

The washing steps of the invention will now be described with reference to FIG. 2. In practice, in this specific preferred embodiment, these are steps in a longer sequence of operations also involving the washing of the dialysate side 36. However, the essential process steps according to the invention are as follows. Inlet branch 48 is connected, via valve box 14, to a wash water supply hose 68 fed into the back of the valve box 14. Drain branch 52 is connected, via valve box 14, to a drain hose 70 fed into the back of the valve box 14. Fluid inlet branch 64 and drain branch 60 of the outlet hose 22 of the blood side 34 are similarly connected by a valve box 14 to the water supply hose 68 and the drain hose 70 respectively. With valve 50 and valve 62 in the open position, whilst valves 58, 54 and 66 remain closed, wash water is continuously circulated through blood side 34, in through branch 48 and inlet hose 16, and out through outlet hose 22 and drain branch 60. After thus flushing for a period of time, e.g., 15 minutes, valve 62 in the outlet drain branch 60 is closed whilst introduction of water continues. This causes fluid pressure in the blood side 34 of the cartridge to build up, with consequent resilient expansion of the hoses 16, 22, and the membrane 38. About 1 second later, the valve 50 is closed to cut off the water supply and contain the pressure within the cartridge 32 and the hoses. Next, about ½ second later, valve 54 in the drain branch 52 of the inlet conduit 16 is opened briefly, for about 1 second. This causes a brief reversal of the direction of flow of water within the blood side 34 of the cartridge 32, as the hoses 16, 22 and the membrane 38 relax. This reversal of flow results in a desirable scrubbing effect to complete the cleaning and dislodgement of contaminating particles from the membrane and elsewhere in the blood side of the cartridge. However, the reversal of flow is for such a brief duration that no contaminated washing water re-enters the washing apparatus tubes such as tube 16, where contaminating particles might become deposited to cross-contaminate water flowing therethrough into another filter being washed in a subsequent operation in the apparatus according to the invention.

Figure 3:
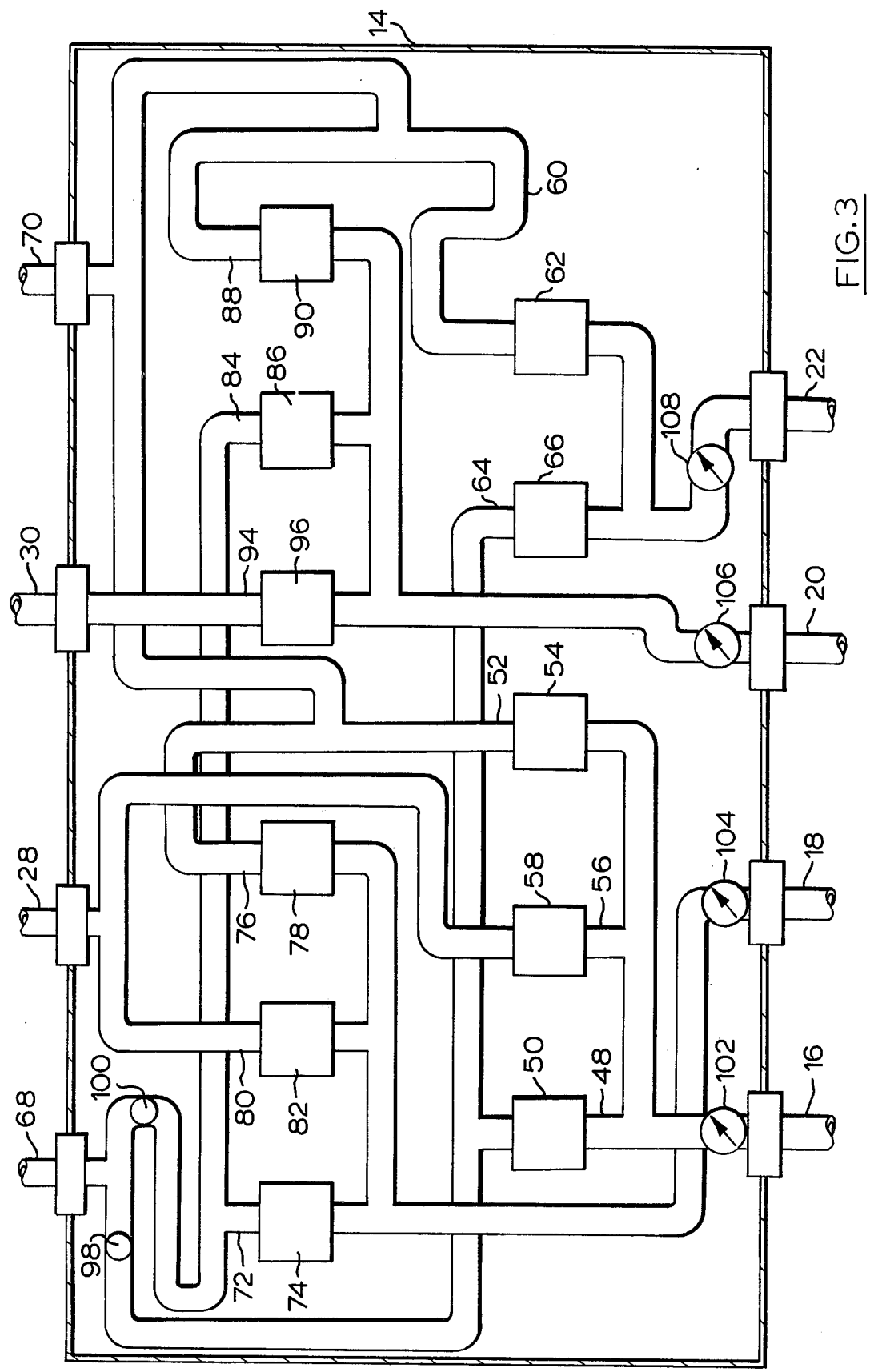
FIG. 3 is a diagrammatic sectional view of the valve box used in the apparatus of FIG. 1 and FIG. 2, showing the valve and conduit arrangements.

The above dynamic washing procedure applied to the blood side 34 of the cartridge 32 constitutes, in the specific preferred embodiment of the invention, a step in an overall washing sequence for the cartridge 32, for washing both blood side 34 and the dialysate side 36, in a preset, automatic, sequential process in a single apparatus. Thus the dialysate side outlet 44 is connected to flexible outlet hose 18 from the valve box 14, which hose constitutes a branched outlet hose for the dialysate side 36. Inlet branch 72, provided with solenoid operated valve 74, connects via valve box 14 with water supply hose 68. Drain branch 76, provided with solenoid operated valve 78, connects via valve box 14 with drain hose 70. A third branch 80 constitutes a formalin supply branch, and is provided with a solenoid operated valve 82 and connected by valve box 14 with the formalin supply hose 28. The dialysate side inlet is connected to the flexible inlet hose 20 from the valve box 14, which hose constitutes a branched hose or conduit for the dialysate side, having three branches therein. Inlet branch 84 with solenoid operated valve 86, connects via valve box 14 with water supply hose 68. Drain branch 88 with solenoid operated valve 90 connects via valve box 14 with drain hose 70. Peroxide supply branch 94 with solenoid operated valve 96 connects via valve box 14 with hydrogen peroxide supply hose 30. As shown in FIG. 3, the water supply hose in the valve box 14 is provided with pressure regulator valves 98, 100, and the valve box outlet hoses 16, 18, 20, 22 are provided with respective pressure meters 102, 104, 106 and 108 to report pressure flows, etc., therethrough, for control purposes.

In a complete sequence of operations according to this specific embodiment of the present invention, twelve distinct steps are involved. In the zero, reset, step all the drain valves 54, 62, 78 and 90 are set to the open position so that both sides of the cartridge 32 are effectively emptied of fluids. In the first operational step, water is flushed steadily and continuously through both the blood side 34, using inlet branch 48 and drain branch 60, and through the dialysate side 36, using inlet branch 84 and drain branch 76, so that there is static water flow on both sides of membrane 38, but in opposite directions. In the second operational step, dynamic flow in the blood side 34 is conducted, as previously described, with the pressurizing and brief reversal of fluid flow caused by resilient contraction of the hoses and membrane. During this dynamic flow in the blood side, water supply to the dialysate side is discontinued and the drain valves 78, 90 thereto are opened. The third operational step has the drain valves 54, 62 to the blood side 34 open, so as essentially to empty it, whilst the drain valve 78, 90, water inlet valves 74, 86, and formalin supply valve 82 to the dialysate side 36 are closed and peroxide supply valve 96 thereto is opened, thus filling the dialysate side with hydrogen peroxide solution. Operational step four comprises a continuation of step three to build up pressure of hydrogen peroxide in the dialysate side, closing of all valves to the dialysate side 36 to maintain hydrogen peroxide pressure therein, with the blood side draining out. This causes penetration of the membrane with hydrogen peroxide for efficient cleaning thereof.

Now, in operational step five, the first operational step is repeated, with water flow through both the blood side and the dialysate side, in reverse directions. Operational step six is similarly a repeat of the second operational step, with a dynamic washing of the blood side in accordance with the invention, with draining of the dialysate side. Next, in operational step seven, the blood side is drained and then filled with formalin, for sterilizing purposes. Operational step eight involves the discharge of a small amount of formalin through the drain branch 52 and valve 54 of the blood side 32 for sterilization of this branch. In operational step nine, the dialysate side is filled with formalin for sterilization, and in operational step ten, a small amount of the formalin is drained through drain conduit 76 of the dialysate side, so as to sterilize it. Then in operational step eleven, both sides are maintained full of formalin and all valves are closed. The cartridge 32 can now be removed from the machine, stored full of formalin, and the machine returned to the reset, zero position ready for use with another cartridge.

The control and operation of the apparatus according to the preferred embodiment of the invention is suitably by standard electrical components arranged to open and close the solenoid operated valves according to a predetermined sequence and for predetermined intervals of time. Such components and arrangements thereof are within the skill of the art, being generally similar to those previously employed for other automatic washing machines, although set for different sequences and combinations of operations, of course. Detailed description of the individual components and their function is not necessary herein. By way of example, a suitable arrangement is illustrated diagrammatically in FIG. 4, and comprises a cycle timer 110, a program module 112 and a drive module 114. The cycle timer 110 is fed by a clock signal, and includes a binary step counter, a multiplexer, a demultiplexer and ten electronic timers, one for each of the operational steps, omitting the zero, reset step and the final, formalin filled storage steps which are not timed. As indicated diagrammatically in FIG. 4, the cycle timer thus feeds twelve different signals 116, in sequence to the program module 112, for the sequential operation by the program module of each of the twelve operational steps. The program module 112 receives these command signals 116 from the cycle timer and, by means of a diode matrix sends appropriate energizing signals 118, one for each solenoid operated valve in the valve box 14, to the driver module 114. The driver module includes solenoid drivers for operating each of the eleven solenoid operated valves 50, 54, 58, 66, 62, 74, 78, 82, 86, 90, 96, controlling the branches of the branched hoses connecting to the filter unit 30 being washed, to open and close these valves as necessary to perform the above described operations in the desired sequence.

It will be noted that the electrical control box 10 containing the cycle timer and program module has ten manually operable controls 12 readily accessible on its front face. These are adapted to set the time intervals for which each of the operating steps 1-10 will extend. These intervals can thus be varied readily and simply, to obtain the optimum washing cycle. A reset control is also suitably provided to stop the apparatus in mid-cycle if required.

The materials from which the various components are made should be chosen with regard to the requirement to avoid unnecessary contamination of the washing fluids, etc. Tubing of polyethylene, nylon or the like has been found suitable. For conduits 16, 22 which are required to exhibit elasticity, thin wall polyethylene tubing of outer diameter of about ⅛ inch is preferred.

In some circumstances, it is preferred to have the controls 12 inaccessible on the inside of the box 10, and preset to the desired washing cycle. This is particularly so when a patient is to be provided with such a machine in his own home, to operate himself. Then it is desirable to have the controls preset, to be altered only by qualified personnel.

The process and apparatus of the invention is adapted to wash cartridges containing of a wide variety of filter membranes. A whole variety of such artificial kidneys are available on the market, having membranes, of widely differing shapes, sizes and configurations—fluted, planar, convoluted, etc. The configuration of the membrane is not critical in the present invention.

What I claim is:

1. Apparatus for washing an artificial kidney of the type comprising a housing, a first, blood compartment, a second dialysate compartment and a flexible filter membrane separating said first and second compartments and constituting a side wall of said first compartment, a fluid inlet for said first compartment, a fluid outlet for said first compartment, said inlet and said outlet communicating with the first compartment at locations remote from one another, said apparatus comprising:

a fluid inlet hose adapted to communicate with said fluid inlet;

a washing fluid inlet branch communicating with the fluid inlet hose and adapted to supply washing fluid to said first compartment for circulation therethrough in contact with one side of said flexible filter membrane;

a pressure regulator valve in said washing fluid inlet branch, adapted to regulate fluid pressures therein;

first valve means in said washing fluid inlet branch adapted to open and close fluid communication therethrough;

a drain branch communicating with the fluid inlet hose;

second valve means in said drain branch adapted to open and close fluid communication therethrough;

a fluid outlet hose which has a section which is resiliently expandable and contractable in response to fluid pressure changes in said first compartment, said outlet hose being adapted to communicate with said outlet and provide for discharge of the washing fluid from the first compartment to maintain circulation of the fluid in contact with one side of the membrane;

third valve means in said fluid outlet hose adapted to open and close fluid communication therethrough;

operating means for opening and closing the first, second and third valve means;

timing means controlling said operating means and arranged to actuate said operating means for opening and closing the first, second and third valve means in a predetermined sequence and for predetermined time intervals.

2. Apparatus according to claim 1 wherein said fluid inlet hose has a third branch communicating therewith, and adapted to supply sterilizing fluid to said housing, fourth valve means in said third branch adapted to open and close communication therethrough, operating means for said fourth valve means, said operating means also being controlled by said timing means, and wherein said fluid inlet hose also has a section which is resiliently expandable and contractable in response to fluid pressure changes in said first compartment.

3. Apparatus according to claim 2 wherein the second, dialysate compartment has fluid inlet means and fluid outlet means, and further including a second fluid inlet hose and a second fluid outlet hose conduit adapted for attachment respectively to said fluid inlet and fluid outlet means of the second compartment, said second fluid outlet hose having a valved washing fluid inlet branch, a valved drain branch and a valved sterilizing solution inlet branch, said second fluid outlet hose having a valved washing fluid inlet branch, a valved drain branch, and a valved blood solvent inlet branch; and operating means for opening and closing the valves in said branches of said second fluid inlet hose and said second fluid outlet hose conduit; said operating means being controlled by said timing means for opening and closing thereof in predetermined sequence and for predetermined time intervals.

4. Apparatus according to claim 3 wherein all of the valves associated with the first and second fluid inlets and first and second fluid outlets are solenoid operated valves, said operating means comprising solenoids adapted to be energized in predetermined sequence and for predetermined time intervals.

* * * * *